US012088094B2

(12) United States Patent
Wendt

(10) Patent No.: US 12,088,094 B2
(45) Date of Patent: Sep. 10, 2024

(54) DC-POWER SUPPLY DEVICE, DC-POWERED DEVICE, AND OPERATING METHODS

(71) Applicant: SIGNIFY HOLDING B.V., Eindhoven (NL)

(72) Inventor: Matthias Wendt, Würselen (DE)

(73) Assignee: SIGNIFY HOLDING, B.V., Eindhoven (NL)

( * ) Notice: Subject to any disclaimer, the term of this patent is extended or adjusted under 35 U.S.C. 154(b) by 280 days.

(21) Appl. No.: 17/293,169

(22) PCT Filed: Nov. 1, 2019

(86) PCT No.: PCT/EP2019/079981
§ 371 (c)(1),
(2) Date: May 12, 2021

(87) PCT Pub. No.: WO2020/099152
PCT Pub. Date: May 22, 2020

(65) Prior Publication Data
US 2022/0014019 A1    Jan. 13, 2022

(30) Foreign Application Priority Data
Nov. 12, 2018  (EP) ................................ 18205675

(51) Int. Cl.
*H02J 1/14*     (2006.01)
*H02J 1/06*     (2006.01)
*H02J 13/00*    (2006.01)

(52) U.S. Cl.
CPC ................. *H02J 1/14* (2013.01); *H02J 1/06* (2013.01); *H02J 13/00002* (2020.01); *H02J 13/00006* (2020.01); *H02J 13/0005* (2020.01)

(58) Field of Classification Search
CPC .......... H02J 1/14; H02J 1/06; H02J 13/00002; H02J 13/00006; H02J 13/0005;
(Continued)

(56) References Cited

U.S. PATENT DOCUMENTS

2007/0025039 A1* 2/2007 Sousa ...................... H02J 1/14
                                                       361/90
2011/0273108 A1* 11/2011 Sivertsen ............... H05B 47/18
                                                       315/250
(Continued)

FOREIGN PATENT DOCUMENTS

EP    3236615 A1    4/2017
KR    20170085469 A    7/2017

OTHER PUBLICATIONS

Ludwig Winkle, "CFI 10Mb/s Single Twisted Pair Ethernet (10SPE)", online available http://www.ieee802.org/3/cfi/0716_1/CFI_01_0716.pdf.
(Continued)

*Primary Examiner* — Rexford N Barnie
*Assistant Examiner* — Thai H Tran

(57) ABSTRACT

The invention relates to a DC-power supply device (400) for supplying operational DC-power to one or more DC-powered devices that have respective DC-power requirements, that comprises a power interface (402) for providing, via a single twisted-pair wired bus (401), DC output power, a DC-power-supply network communication unit (404) configured to receive DC-power requirement information indicative of a DC-voltage requirement and a DC-current requirement for operation of the respective connected DC-powered devices, and a DC-power-supply control unit (406) configured to drive, in an initialization supply mode, delivery of initialization DC-output power amount, that is suitable for transmission by the DC-powered devices of respective DC-power requirement information, to determine, using
(Continued)

the DC-power requirement information and a power-determination rule, and provide an operational DC output power for powering operation of at least one the DC-powered devices in its regular operation mode, thus enabling a powering of multiple DC-powered devices having different DC-power requirements.

12 Claims, 6 Drawing Sheets

(58) Field of Classification Search
CPC ......... Y02B 90/20; Y04S 40/12; H05B 47/18; H05B 47/185
See application file for complete search history.

(56) References Cited

U.S. PATENT DOCUMENTS

| | | | |
|---|---|---|---|
| 2014/0040641 A1* | 2/2014 | Diab | H04L 12/10 713/300 |
| 2015/0145324 A1* | 5/2015 | Heath | H04L 12/40045 307/1 |
| 2016/0054777 A1* | 2/2016 | Dwelley | G06F 1/3287 710/110 |
| 2017/0222436 A1 | 8/2017 | Wendt | |
| 2017/0302462 A1* | 10/2017 | Yun | H04L 12/10 |

OTHER PUBLICATIONS

Task group information on IEEE 802.3cg: 10Mb/s Single Twisted Pair Ethernet (10SPE), online available http://www.ieee802.org/3/cg/.
Dave Dwelley, "Call for interest (CFI) for PoDL power over data lines", Jul. 16, 2013, online available http://www.ieee802.org/3/1PPODL/public/jul13/CFI_01_0713.pdf.
Dave Dwelley, "IEEE P802.3bu Power over Data Lines Tutorial", Nov. 2015, online available http://www.ieee802.org/802_tutorials/2015-11/PoDL_tutorial_1115.pdf.
"Task group information on IEEE P802.3bu 1-Pair Power over Data Lines (PoDL)" online available http://www.ieee802.org/3/bu/.
Andy Gardner, "Serial Communication Classification Protocol (SCCP) for PoDL", Linear Technology—Online available http://www.ieee802.org/3/bu/public/nov14/gardner_3bu_2_1114.pdf.
Valerie Maguire, IEEE Std 802.3bu-2016: Power over Data Lines (PoDL): Standards Informant blog online http://blog.siemon.com/standards/ieee-std-802-3bu-2016-power-over-data-lines-podl.
Valerie Maguire, "IEEE Std 802.3cg 10 Mb/s Single-Pair Ethernet Task Force (10SPE)" Standards Informant blog online http://blog.siemon.com/standards/ieee-p802-3cg-10-mbs-single-twisted-pair-ethernet-task-force.
Valerie Maguire, "IEEE Std 802.3bw-2015: 100BASE-T1" Standards Informant blog online http://blog.siemon.com/standards/ieee-std-802-3bw-2015-100base-t1.
Chris Diminico, "SPE White Paper," Mar. 3, 2018, IEEE 802.24.2, IoT Task Group.

* cited by examiner

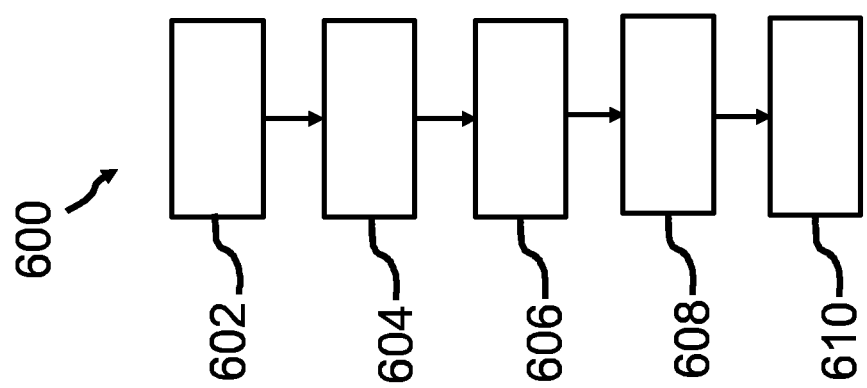

DC-POWER SUPPLY DEVICE, DC-POWERED DEVICE, AND OPERATING METHODS

CROSS-REFERENCE TO PRIOR APPLICATIONS

This application is the U.S. National Phase application under 35 U.S.C. § 371 of International Application No. PCT/EP2019/079981, filed on Nov. 1, 2019, which claims the benefit of European Patent Application No. 18205675.4, filed on Nov. 12, 2018. These applications are hereby incorporated by reference herein.

FIELD OF THE INVENTION

The present invention is directed to a DC-power supply device, to a DC-powered device, to an electrical arrangement, to a method for operating a DC-power supply device, to a method for operating a DC-powered device, and to respective computer programs.

BACKGROUND OF THE INVENTION

US 2017/0222436 A1 describes a power distribution system for distributing power from a power supply to several electrical loads via sockets. The sockets receive power requests from the electrical loads and transmit the power requests to a master device which controls the power to be provided by the respective socket based on the received power requests. Since the master device receives all power requests from the sockets and has therefore an overview of the overall power requirements, the master device can determine the power to be provided by the respective socket under consideration of this knowledge.

SUMMARY OF THE INVENTION

The inventor has recognized that it would be beneficial to provide improved flexibility in configuring a network that comprises a DC-power supply device and DC-powered devices connected in parallel via a single wired bus.

The invention is further based on the recognition that a flexible configurability of an electrical arrangement (herein also called network) that comprises a DC-power supply device and DC-powered devices connected in parallel via a single wired bus must provide technical capabilities of the DC-power supply device and of the DC-powered devices for enabling a regular operation of the DC-powered devices under the provision of operational DC power with a DC voltage amount that depends on the number and respective requirements of individual DC-powered devices connected to the DC-power supply device. According to the present invention, this is achieved by providing a DC-power supply device according to a first aspect of the invention and by a DC-powered devices according to the second aspect of the invention, which will both be described further below. Further aspects of the invention will then also be described.

Thus, according to a first aspect of the present invention, a DC-power supply device for supplying operational DC power to one or more DC-powered devices is provided. The DC-power supply device is for use in an electrical arrangement or network, in which each DC-powered device is operable in an initialization mode requiring a lower DC power amount than in a respective regular operation mode of the DC-powered device.

The DC-power supply device comprises a power interface for providing, via a single twisted-pair wired bus, DC output power to a plurality of DC-powered devices that are connected in parallel via the wired bus. The DC-power supply device also comprises a DC-power-supply network communication unit configured to receive, via the power interface, and from the DC-powered devices connected via the wired bus, respective DC-power requirement information indicative of a DC-voltage requirement and a DC-current requirement for operation of the respective DC-powered devices in their respective regular operation mode.

The DC-power supply device further comprises a DC-power-supply control unit, which is configured to drive, operating the DC-power supply device in an initialization supply mode, delivery of a predetermined initialization DC output power amount via the power interface. The initialization DC output power amount is suitable for driving the connected DC-powered devices in their initialization mode that includes transmission of the respective power requirement information for their respective regular operation mode to the DC-power-supply device via the wired bus. It is also configured to determine from among a plurality of available DC output power amounts that the DC-power supply device is configured to supply in an operation supply mode, using the DC-power requirement information received from the connected DC-powered devices and a predetermined power-determination rule, an operational DC output power amount to be output via the output power interface, the operational DC output power amount having an operational DC voltage amount being suitable for powering operation of the connected DC-powered devices in their respective regular operation modes. The DC-power-supply control unit is further configured to subsequently drive, operating the DC-power supply device in the operation supply mode, distribution of the determined operational DC output power amount to the connected DC-powered devices via the power interface.

The DC-power supply device forms a network component supplying operational DC power to one or more DC-powered devices in a network configuration in which a plurality of DC-powered devices can be connected to the DC-power supply device in parallel via a single twisted-pair wired bus. In this network configuration, the DC-power supply device and the DC-powered devices form network nodes that share a physical medium for both power supply and data exchange. In the present context, the physical medium is a single twisted pair wired bus, herein also referred to in short as a wired bus. Typically, the wired bus takes the form of a single twisted pair wired cable. However, in an alternative, the present invention is implemented using an alternative physical medium for both power supply and data exchange, which alternative physical medium is different from a single twisted pair wired cable.

The DC-power supply device of the first aspect of the invention is advantageously configured for flexibly determining an operational DC output power amount to be delivered to the connected DC-powered devices via the wired bus, using the DC-power requirement information provided by the DC-powered devices via the wired bus and received by the DC-power supply device via its power interface during an initialization phase.

The provision of this DC-power requirement information is enabled by the DC-power supply device by means of a DC-power-supply control unit, which is configured to operate the DC-power supply device in an initialization supply mode and in an operation supply mode. In the initialization supply mode, the DC-power supply device is operated to provide a predetermined initialization DC output power amount to the connected DC-powered devices via the power interface. The initialization DC output power amount is suitable for driving the connected DC-powered devices in their initialization mode. The initialization mode operation of the DC-powered devices includes, as will be described in the context of the second aspect of the invention, the transmission of the respective power requirement information for the respective regular operation mode of the given DC-powered device. The transmission of the respective power requirement information from the DC-powered device to the DC-power-supply device is performed via the wired bus.

Since the DC-powered devices, each forming a load, are all connected in parallel to the DC-power supply device, the DC-voltage amount provided at the power interface of the DC-power supply device will have the same DC-voltage amount for each of the DC-powered devices (not taking into account losses along the wired bus).

Typically, however, the connected DC-powered devices have different respective DC-voltage requirements and DC-current requirements for operation in their respective regular operation modes.

Using the DC-power requirement information received from the connected DC-powered devices, the DC-power-supply control unit determines, further using a predetermined power-determination rule, an operational DC output power amount to be output via the output power interface. This predetermined power-determination rule determines an operational DC output power amount that is suitable for powering operation of the connected DC-powered devices in their respective regular operation mode. The power-determination rule thus uses the collected information to determine, e.g., a DC voltage amount suitable for enabling the connected individual DC-powered devices to operate in their regular operation mode, and a DC power amount fulfilling the power requirements of the connected DC-powered devices to operate in their regular operation mode. The DC power supply device is therefore configured to determine the operational DC output power amount from among a plurality of available DC output power amounts that the DC-power supply device is configured to supply in its operation supply mode, i.e., when delivering DC output power for regular operation of the DC-powered devices.

Subsequently, the DC-power-supply control unit drives operation of the DC-power supply device in the operation supply mode, involving delivery of the determined operational DC output power amount, and in particular providing the determined DC output voltage amount to the connected DC-powered devices via the power interface that allows operation of the connected DC-powered devices in their respective regular operation mode.

The DC-power supply device of the first aspect is therefore advantageously enables an automated power optimizing scheme by flexibly determining and providing operational DC output power having a DC-voltage amount suitable for power delivery to a plurality initially unknown DC-powered devices connected via the wired bus.

Before turning to the description of embodiments of the DC-power supply device of the first aspect of the invention, the following will disclose and explain the DC-powered device of the second aspect of the invention. By this direct juxtaposition of the devices of the first and second aspects, the complementary contributions of their features to the present invention will become particularly clear.

According to a second aspect of the present invention, thus, a DC-powered device is provided. The DC-powered device comprises a DC-powered device control unit configured to control operation of the DC-powered device in a regular operation mode and in an initialization mode, the initialization mode requiring a predetermined initialization DC input power amount lower than an operational DC-power amount required by the regular operation mode of the DC-powered device.

The DC-powered device further comprises an input power interface for receiving DC-power from a DC-power supply device via a single twisted-pair wired bus.

The DC-powered device also includes a storage unit configured to store DC-power requirement information indicative of a DC-voltage requirement and a DC-current requirement for operation of the DC-powered device in the regular operation mode.

The DC-powered device further comprises a DC-powered device communication unit configured to provide, while the DC-powered device is operated in the initialization mode, the DC-power requirement information via the wired bus.

Furthermore, the DC-powered device has a power converting unit connected with the input power interface and comprising a down converter stage configured to receive DC-power with an input DC-voltage having an operational DC voltage amount from among a plurality of available DC output power amounts that the DC-power supply device is configured to supply and to provide, for operation of the DC-powered device in its regular operation mode, a converted DC power with a down converted DC voltage amount that is equal to or lower than that of the input DC-voltage and in accordance with the DC voltage requirement.

Accordingly, the DC-powered device has two operational modes, an initialization mode and a regular operation mode. The initialization mode requires a predetermined initialization DC input power amount lower than an operational DC-power amount required by the regular operation mode of the DC-powered device. As explained before in the context of the first aspect of the present invention, while the DC-power supply device is operating in its initialization supply mode, the DC-power amount provided to the connected DC-powered devices is lower than during the operation supply mode.

When the DC-powered device first receives DC-power from the external DC-power supply device, the DC-powered device control unit controls operation of the DC-powered device in an initialization mode. Under operation in the initialization mode, DC-power requirement information, which is stored in the storage unit, is provided to the DC-power supply device via the wired bus. However, it is noted that operation of the DC-powered device in its initialization mode is not necessarily coupled to operation of the DC-power supply device in its initialization supply mode. As will be explained in the context of embodiments further below, in certain situations, the DC-powered device is operated in its initialization mode while the DC power supply device is operated in is operation supply mode.

In any case, as explained in the context of the first aspect of the invention, the DC-power supply device then uses the DC-power requirement information to determine the operational DC output power amount to be output via the wired bus. This operational DC output power amount has a DC-voltage higher than that of the DC-power amount provided during the initialization supply mode and is suitable for allowing the connected DC-powered devices in their regular operational modes. Since in a parallel connection the DC-power supply device can only provide one DC voltage amount to all connected DC-powered devices, a given DC-powered device may not receive a voltage amount that is in agreement with the transmitted DC-power requirement information. However, even if the DC-voltage of the operational DC output power amount is higher than the required DC-voltage for operating in the regular operation mode, the down converter stage is suitably configured to receive the DC-power with an input DC-voltage higher than required and to output the converted DC power with a down converted DC-voltage equal to or lower than the input DC-voltage and in accordance with the DC voltage requirement. This way, the DC-powered device enables operation in its regular operation mode under a variety of different voltage amounts received from the DC power supply device via the wired bus.

Thus, the DC-power supply device of the first aspect of the invention and the DC-powered device of the second aspect of the invention together enable operation with an automated power adjustment to a given configuration of DC-powered devices in a network is enabled. The DC-powered device provides stored DC-power requirement information, and is capable of flexibly operating in its regular operation mode under provision of DC-power an operational DC voltage amount from among a plurality of available DC output power amounts that the DC-power supply device is configured to supply in its operation supply mode.

As will be explained further below in the course of the description of embodiments, by virtue of the devices of the first and second aspect, the present invention even enables adding a further DC-powered device to a network and removing one of the connected DC-powered device from the network, while the connected DC-powered devices are in their regular operation modes. This additional capability is also referred to as hot plugging or hot unplugging.

The description now turns to embodiments of the first and second aspects of the invention. In the following, embodiments of the DC-power supply device of the first aspect of the present invention will be described.

The flexibility of the DC-power supply device is enhanced in both an initialization phase of an electrical arrangement or network, i.e., upon first powering up the connected DC-powered devices, and in an operational phase, i.e., while the DC-powered devices are being operated in their regular operation mode.

In one embodiment concerning the first case of the initialization phase, the DC-power supply device further comprises a DC-powered device detection unit configured to detect, while the DC-power supply device is being operated in the initialization mode, a connection of at least one DC-powered device to the output power interface via the wired bus, and to provide an initialization detection signal indicative thereof to the DC-power-supply control unit. In this particular embodiment, the DC-power-supply control unit is configured to drive, in the initialization mode, delivery of the predetermined initialization DC output power amount via the power interface upon receiving the detection signal.

In another embodiment concerning the second case of the operational phase, the DC-powered device detection unit is further configured to detect, while the DC-power supply device is being operated in the operation supply mode, a new-connection event involving connection of an additional DC-powered device to the wired bus, and a disconnection event involving disconnection of a previously connected DC-powered device from the wired bus, and to provide a respective event detection signal indicative of the new-connection event or of the disconnection event. In this particular embodiment, the DC-power-supply control unit is further configured, while operating the DC-power supply device in the operation supply mode, and upon reception of the event detection signal indicative of a new-connection event, to maintain, for providing the initialization DC-power amount to the additional DC-powered device, a currently provided operational DC-voltage amount, and, upon reception of the event detection signal indicative of a new-connection event or of a disconnection event, to re-determine, based on the predetermined power-determination rule and on the DC-voltage requirements and the DC-current requirements of the DC-powered devices that are currently connected to the wired bus, the operational DC output power amount to be output via the power interface. This preferred embodiment is thus configured to enable "hot plugging" and "hot unplugging" of DC-powered devices, i.e., connection or disconnection of DC-powered devices while the DC-power supply device is operating in the operation supply mode.

In this embodiment, the DC-power supply dynamically adapts the provision of operational DC-power to a change in the currently connected DC-powered devices. Newly connected DC-powered devices receive from the DC-power supply device sufficient DC-power for providing their DC-power requirement information, and the DC-power supply device uses this DC-power requirement information and the power-determination rule to re-determine the operational DC output power amount needed by the connected DC-powered devices. To enable the addition of one or more DC-powered devices to a network, the DC-power supply device is suitably configured to maintain a power margin available for powering an extra DC-powered device at least in its initialization mode. Of course, the capability of a DC-power supply device to supply newly added further DC-powered devices is limited according to technical specifications of the DC-power supply device, and the power margin will thus be exhausted when a certain maximum number of connected DC-powered devices has been reached.

The DC-power supply device is thus configured to adapt the delivery of DC-current, within its specified practical limits, to provide enough DC-power to the newly connected DC-powered device to at least operate in the initialization mode. If switching to the regular operational mode is not possible due to limitations of the DC-power supply device, the added DC-powered device will not be allowed to switch to its regular operation mode by suitable control signaling between the DC-power supply device and the corresponding DC-powered device carried out in its initialization mode.

In another embodiment of the DC-power supply device of the first aspect that is configured to detect new-connection events and disconnection events, the DC-powered device detection unit is additionally configured to determine a number of DC-powered devices connected to the wired bus, and, upon determining that no DC-powered devices are currently connected to provide a no-connection signal indicative thereof. In this particular embodiment the DC-power-supply control unit is configured to receive the no-connection signal and, upon reception thereof, to drive operation of the power interface to cease provision of operational DC-power via the wired bus.

In a particular embodiment, the determination of the number of DC-powered devices by the DC-powered device detection unit is based on a monitoring of a current amount of DC-power provided via the power interface by the DC-powered device detection unit. In an alternative embodiment, message exchange between the DC-powered devices and the DC-power supply device under an OSI layer-2 communication protocol is used for determining the number of DC-powered devices, as will be described in more detail further below.

In another embodiment, the DC-power-supply control unit is configured to drive the DC-power supply network communication unit for providing a shut-down request to one or more of the DC-powered devices via the wired bus. In this embodiment, the shut-down request is provided in dependence on the respective DC-voltage requirements and DC-current requirements received by the DC-power-supply network communication. This embodiment is particularly advantageous in cases where the determined operation DC-power amount is not suitable for powering all of the DC-powered devices connected. DC-power-supply network communication thus provides a shutdown request to those connected DC-powered devices that according to the DC-power supply control unit should stop requesting, and thus no longer receive, operational DC-power.

The DC-power requirement information can take different forms. As stated above, the connected DC-powered devices typically have different DC-voltage requirements and DC-current requirements for operation in their respective regular operation mode. The DC-power requirement information associated with an individual DC-powered device in some embodiments includes information pertaining to a preferred DC-voltage amount for operating the given DC-powered device in the regular operation mode, together with one or more suitable DC-current amounts. In some variants, the transmitted DC-power requirement information further comprises information pertaining to further compatible DC-voltage amounts, suitably also in combination with corresponding maximum DC-current amounts that are also required for operating the DC-powered devices in their respective regular operational mode.

In some network configurations, different DC-powered devices have different priority levels in terms of power provision, typically depending on a degree of importance or an essentiality status assigned to a function performed by the DC-powered device. In one embodiment, the DC-power requirement information further includes power priority level data indicative of a hierarchical priority level of the respective DC-powered device among the connected DC-powered devices. In such embodiments making use of power priority level data, the power-determination rule advantageously also uses the respective hierarchical priority levels of the DC-powered devices connected via the wired bus. Thus, in this particular embodiment, the DC-power-supply control unit is configured to determine the amount of operational DC-power further using the received priority level data.

The reception of this priority level data and the inclusion of the corresponding information in the determination of the operational DC-power supply to be provided via the power interface enhances the adaptability of the DC-power supply device in determining negotiating a distribution of operational DC power and provision of operational DC-power fitting the intended application case in the best possible configuration.

The DC-power requirement information provided by the DC-powered devices is in some embodiments indicative of different DC-voltage requirements and different DC-current requirements for operation of the respective DC-powered devices in different respective regular operation modes. In a variant of this embodiment wherein the DC-power-supply network communication unit is further configured to receive power priority level data, the DC-power-supply control unit is further configured to drive the DC-power supply network communication unit for providing, in further dependence on the respective priority level received from the respective DC-powered device, a request for operating the DC-powered device in a different one of the regular operation modes, which in one particular variant also includes a request to one or more of the DC-powered devices via the wired bus to shut-down.

A non-limiting example of a power-determination rule that is suitable for any of the embodiments of the first aspect of the invention includes providing, at the power interface a DC-voltage amount at least equal to the highest value of DC-voltage required by any one of the DC-powered devices, and then adapt the provided DC-current to meet the DC-current requirement of all connected DC-powered devices, always within the current limit of the DC-power supply device. DC-power supply devices configured.

In a particularly suitable embodiment, the DC-power-supply network communication unit is configured to transmit and receive data according to a IEEE 802.3bu standard. Further, the DC-power-supply control unit is configured to drive operation of the output power interface also according to the IEEE 802.3bu standard. Furthermore, the DC-power supply device is preferentially configured for operation in accordance with the IEEE 802.3cg standard.

In one particular embodiment, compliant with the IEEE 802.3bu standard, and comprising a DC-powered device detection unit, the DC-powered device detection unit is configured to perform, while operating in the initialization supply mode, a detection routine using a serial communication classification protocol in accordance with the IEEE 802.3bu standard.

In particular, in an embodiment compliant with the IEEE 802.3bu standard, wherein the power requirement information is included in a Link Layer Discovery Protocol packet, and preferably in a non-routed Link Layer Discovery Protocol packet.

In an embodiment involving the previously described detection of new-connection events and disconnection events, the re-determination of the operational DC output power amount to be output via the power interface makes use of the compliance of the DC power supply device with an Ethernet standard of the IEEE 802.3 family, in particular the IEEE 802.3bu standard. More specifically, the determination of the amount of DC-powered devices by the DC-powered device detection unit is based on a monitoring of respective MAC addresses of the connected DC-powered devices. In accordance with said standard, the DC-powered devices are assigned a MAC address that is provided to the DC-power supply device via the wired bus.

In a particular embodiment, the received MAC addresses are additionally used by the DC-powered device detection unit to determine the number of DC-powered devices connected in parallel to the wired bus.

In a preferred embodiment, the initialization DC-power has a DC-voltage amount of at least 3 volts. Also in a preferred embodiment, the operational DC output power amount has a DC-voltage amount equal to or larger than that of the initialization DC-power and lower than or equal to 60 volts.

Any of the described embodiments of the DC-power supply device may comprise a plurality of power interfaces for connecting a respective set of parallel connected DC-powered devices via a respective wired bus. In this case, the DC-power supply control unit is configured to operate each power interface independently. Thus the DC-power supply device is suitable for providing simultaneously but via different wired buses initialization DC output power amount to a set of connected DC-powered devices and operational DC output power amount to another set of connected DC-powered devices.

In the following, embodiments of the DC-powered device of the second aspect of the invention will be described.

In a preferred embodiment, DC-powered device control unit, during a power-up process of the DC-powered device, DC-powered device is further configured to operate the DC-powered device in the initialization mode even upon detecting a connection of the DC-powered device to the wired bus currently providing a DC-power-amount equal to or larger than the required predetermined initialization DC input power amount. This embodiment thus further enables a hot plugging of the DC-powered device to the wired bus, i.e. a connection to the wired bus, while the DC-power supply device is already delivering operational DC-power and thus operating in the operation supply mode and no longer in the initialization supply mode.

Preferably, in this embodiment the power converting unit, for operating in the initialization mode, is configured to receive DC-power with an input DC-voltage and to output the required initialization DC input power to the DC-powered device communication unit and to the DC-powered device control unit.

In a particular embodiment, the DC-power requirement information is indicative of a minimum required DC-voltage amount and a respective DC-current amount required for operating in the regular operation mode. Alternatively, in another embodiment, the DC-power requirement information is indicative of a preferred DC-voltage amount and a respective DC-current amount for operating in the regular operation mode. In yet another embodiment, the DC-power requirement information is indicative of a minimum required DC-voltage amount and a respective DC-current amount required for operating in different regular operation modes, and of other acceptable DC-voltage amounts and acceptable DC-current amounts compatible with operation of the DC-powered device in the different acceptable regular operation modes.

In another embodiment, the DC-powered device control unit is further configured to receive a shut-down request via the wired bus and the DC-powered device communication unit, and, upon receiving the shut-down request, to cease provision of operational DC-power to the load device. This is particularly suitable for enhancing power negotiation capabilities between the DC-power supply device and multiple DC-powered devices with respective, and not necessarily equal DC-power requirements.

In a preferred embodiment, the storage unit is further configured to store, as part of the DC-power requirement information power priority level data indicative of a priority level for power request from the DC-powered device. In this embodiment, the DC-powered device communication unit is further configured to further provide, upon reception of at least the predetermined initialization DC input power amount, the power priority level data via the wired bus.

Different DC-powered devices may have different priority level for power request which depends on how essential the operation of the DC-powered device in the regular operational mode is. Providing this power priority level data to a suitable DC-power supply device further enhances the power negotiation capabilities and ensure that those DC-powered devices with higher priority levels receive the required power, even at the expense of not powering DC-powered devices with relatively lower priority levels.

In a preferred embodiment, the DC-powered device control unit is configured to control operation of the DC-powered device communication unit in transmitting and receiving data via the wired bus in accordance with a IEEE 802.3bu standard. Preferably, in this embodiment, the power requirement information, eventually including the power priority level are included in a Link Layer Discovery Protocol Packet. In a particular embodiment the Link Layer Discovery Protocol packet is a non-routed Link Layer Discovery Protocol packet.

The down converter stage is preferably configured to allow operation over a DC-voltage range, i.e. a range of DC-voltage levels of the DC-output power, which suitably ranges between 3.3V-60V. An amount of 3.3V is for instance provided during the initialization supply mode. Nominal DC-voltages values of operational DC output power amounts during the operation supply mode range from 4.41V in Class 1 PSEs to 60V in Class 9 PSEs, wherein the classification of the PSE corresponds to a Power Over Data Lines (PoDL) standard which is known per se.

In another embodiment, the storage unit is further configured to store MAC address data indicative of a MAC address of the DC-powered device and wherein the DC-powered device communication unit is further configured to provide the MAC address data via the wired bus, in accordance with the IEEE 802.3bu standard.

As is clear from the above description, the DC-powered device forms and includes an electrical load requiring the DC power for regular operation. In one application case forming a preferred embodiment of the second aspect, the powered device is a lighting device, such as a luminaire. In regular operation mode, the luminaire is operated to emit light according to a predefined lighting function. Different lighting functions can be predefined to implement different regular operation modes having different power requirements.

According to a third aspect of the present invention, an electrical arrangement (network) is provided. The electrical arrangement comprises a DC-power supply device according to the first aspect of the invention or one of its embodiments, and a set of one or more parallel-connected DC-powered devices according to the second aspect of the present invention or one of its embodiments.

The DC-power supply device and the set of DC-powered devices are connected via a single twisted-pair wired bus connecting the power interface of the DC-power supply device and the power input interfaces of the one or more DC-powered devices. The wired bus is configured to transport DC-power, and to transport data packets in accordance with a predetermined communication protocol.

The electrical arrangement of the third aspect of the invention is suitable for introducing a power distribution scheme for use over a single twisted-pair wired bus to which one or more DC-powered devices can be dynamically connected and disconnected.

In the following, embodiments of the electrical arrangement of the third aspect of the invention are described.

The electrical arrangement is particularly advantageous for not requiring separate wired bus lines for transmission of DC-power and data communication. This reduces installation complexity and also weight. In this regard, Power Over Ethernet technology, which requires at least two twisted-pairs to work, cannot provide comparable achievements. Preferably, therefore, in an embodiment, the electrical arrangement is configured for operation using a single twisted-pair wired bus and in accordance with a standard of the IEEE 802.3 (Ethernet) family, namely, the IEEE 802.3cg standard. Also preferably, the electrical arrangement comprises a DC-power supply and DC-powered devices, all being compliant with the IEEE 802.3bu standard.

An embodiment of the electrical arrangement comprises a DC-power supply device, a wired bus and a plurality of DC-powered devices that are connected in parallel to the wired bus. Each of the DC-powered devices may have different DC-power requirements and, in a particular embodiment, power different power priority levels. The DC-power supply device uses the information provided by the DC-powered devices during the initialization supply mode to determine the operational DC output power amount needed for operating at least some of the DC-powered device connected in their respective regular operation mode.

In a preferred embodiment, hot plugging or connection of previously non-connected DC-powered devices to the wired bus and hot unplugging or disconnection of previously connected DC-powered devices while the DC-power supply device is operating in the operation supply mode is enabled by proving a DC-supply device with a DC-powered device detection unit configured to detect, while the DC-power supply device is being operated in the operation supply mode, a new-connection event involving connection of an additional DC-powered device to the wired bus, and a disconnection event involving disconnection of a previously connected DC-powered device from the wired bus. The DC-powered device detection unit is also configured to provide a respective event detection signal indicative of the new-connection event or of the disconnection event. In this embodiment the DC-power-supply control unit is further configured, while operating the DC-power supply device in the operation supply mode and, upon reception of the event detection signal indicative of a new-connection event, to maintain, for providing the initialization DC-power amount to the additional DC-powered device, a currently provided operational DC-voltage amount. Further, upon reception of the event detection signal indicative of a new-connection event or of a disconnection event, the DC-power-supply control unit is configured to re-determine, based on the predetermined power-determination rule and on the DC-voltage requirements and the DC-current requirements of the DC-powered devices that are currently connected to the wired bus, the operational DC output power amount to be output via the power interface.

According to a fourth aspect of the present invention, a method for operating a DC-power supply device for supplying operational DC power to one or more DC-powered devices, each DC-powered device operable in an initialization mode requiring a lower DC power amount than in a respective regular operation mode of the DC-powered device, is presented. The method comprises:

while operating the DC-power supply device in an initialization supply mode, driving delivery of a predetermined initialization DC output power amount via the power interface and the wired bus, wherein the initialization DC output power amount is suitable for driving the connected DC-powered devices in their initialization mode that includes transmission of the respective power requirement information for their respective regular operation mode to the DC-power-supply device via the wired bus;

receiving via the power interface, from the DC-powered devices connected via the single twisted-pair wired bus, respective DC-power requirement information indicative of a DC-voltage requirement and a DC-current requirement for operation of the respective DC-powered devices in their respective regular operation mode;

determining, from among a plurality of available DC output power amounts that the DC-power supply device is configured to supply in an operation supply mode, using the DC-power requirement information received from the connected DC-powered devices and a predetermined power-determination rule, an operational DC output power amount to be output via the output power interface, the operational DC output power amount having an operational DC voltage amount being suitable for powering operation of the connected DC-powered devices in their respective regular operation modes; and subsequently driving, operating the DC-power supply device in the operation supply mode, distribution of the determined operational DC output power amount to the connected DC-powered devices via the power interface.

The method of the fourth aspect of the present invention shares the advantages of the DC-power supply of the first aspect of the invention.

According to a fifth aspect of the present invention, a method for operating a DC-powered device that is operable in a regular operation mode and in an initialization mode, the initialization mode requiring a predetermined initialization DC input power amount lower than an operational DC-power amount required by the regular operation mode of the DC-powered device, is presented. The method comprises:

storing, in a storage unit, DC-power requirement information indicative of a DC-voltage requirement and a DC-current requirement for operation of the DC-powered device in the regular operation mode;

receiving DC-power from a DC-power supply device via a single twisted-pair wired bus;

while the DC-powered device is operated in the initialization mode, providing the DC-power requirement information via the wired bus; and while the DC-powered device is operated in the regular operation mode, receiving DC-power with an input DC-voltage having an operational DC voltage amount from among a plurality of available DC output power amounts that the DC-power supply device is configured to supply, and using the received DC-power for providing converted DC power with a down converted DC-voltage equal to or lower than the input DC-voltage and in accordance with the DC voltage requirement.

The method of the fifth aspect of the present invention shares the advantages of the DC-powered device of the second aspect of the invention.

According to sixth and seventh aspects of the present invention, computer programs are provided that comprise respective instructions which, when the programs are executed by a respective computer, cause the computer to carry out the method of the fourth and the fifth aspect of the invention, respectively.

It shall be understood that the DC-power supply device according to the first aspect, the DC-powered device according to the second aspect, the electrical arrangement according to the third aspect, the method for operating a DC-power supply device according to the fourth aspect, the method for operating a DC-powered device, the computer program and the computer program have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIG. 6 shows a schematic flow diagram of a method for operating a DC-powered device.

DETAILED DESCRIPTION OF EMBODIMENTS

Figure 1:
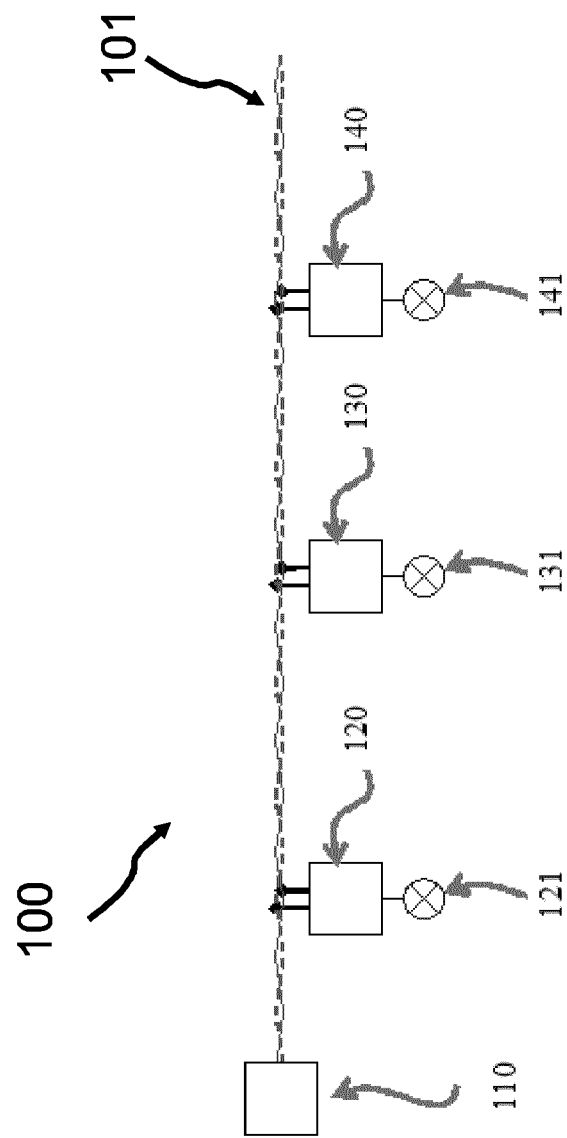
FIG. 1 shows a schematic block diagram of an embodiment of an electrical arrangement including a DC-power supply device and a plurality of DC-powered devices connected to a single twisted-pair wired bus.

FIG. 1 shows an electrical arrangement 100 including a DC-power supply device 110 and a plurality of DC-powered devices 120, 130, 140 connected to a single twisted-pair wired bus 100. In this particular non-limiting example, the electrical arrangement is a connected lighting system where connectivity is realized by means of a multidrop bus like currently standardized in the IEEE803.2cg consortium called 10SPE. The DC-powered devices 120, 130 and 140 are lamp network PD (Powered Device) having a respective lamp as a load device 121, 122, 123 and are in deliberate positions connected to the single twisted pair wired bus 101. The electrical arrangement comprises only one DC-power supply device, also referred to as Power Sourcing Equipment (PSE) and which provides the DC-power to the DC-powered devices, which are also referred to as nodes of the electrical arrangement. Only three nodes 120, 130 and 140 are depicted here. However more or less can be connected to the wired bus 101. The position of the PSE node 110 on one end is deliberately chosen but can also be at any place on the wired bus.

An exemplary electrical arrangement is a connected lighting systems where connectivity is realized by means of a multidrop bus like currently standardized in the IEEE803.2cg consortium called 10SPE. Preferably it is configured to implement a powering scheme according to 10SPE which requires adopting the so called PoDL standard (802.3bu). The same principle is also applicable to other areas such as, but not limited to, industrial, building automation, heating-ventilation and air-conditioning (HVAC), automotive and more.

In the objectives of the 10SPE standard (IEEE802.3cg) it is claimed that power transport over a network shall be part of the considerations and should be standardized. Currently, only the 10SPE peer to peer network topology has a powering option by adopting the so called Power over Data Line (PoDL) standard (IEEE 802.3bu).

The voltages and the amount of power transported can be negotiated be-tween the PSE 110 and nodes 120, 130, 140. However, for multidrop configurations using PoDL there is no way to support any hot plug and unplug actions. PoDL does not include a power negotiation protocol suitable for negotiating power when operational DC output power is already being delivered. PoDL can negotiate power but only before the provision of the operational DC output power, because the used negotiation in PoDL is done via serial communication classification protocol (SCCP). SCCP only works as long as no low impedance wired bus power is applied because data transport from clients to master is done by open drain shorts of the bus.

For multidrop networks such as the electrical arrangement 100, with the flexibility to dynamically add or remove connected DC-powered devices, a different negotiation technique is established. It not only supports the implementation of hot-plug and hot-unplug of DC-powered devices nodes but also enables the addition of an extra level of optimization freedom for system power usage during runtime.

The main principle is to build the input power interface at each DC-powered device in a way that it can adapt to the potential DC-voltages that a DC-power supply device according to the invention can provide. The DC-powered devices 120, 130, 140 need to be able to minimally boot their microcontroller from this initial DC-voltage level and inform the PSE that they would need or prefer a different DC-voltage level and how much power they would like to draw. This is enclosed in DC-power requirement information that the DC-powered device is configured to transmit via the wired bus while operating in an initialization mode. The DC-power supply device 101 uses the DC-power requirement in-formation of the nodes 120, 130, 140, which are connected to the wired-bus 101 to deter-mine, based on a power-determination rule an operational DC output power amount to be output via the output power interface, the operational DC output power amount being suit-able for powering operation of the connected DC-powered devices in their respective regular operation mode. This operational DC output power amount.

Figure 2:
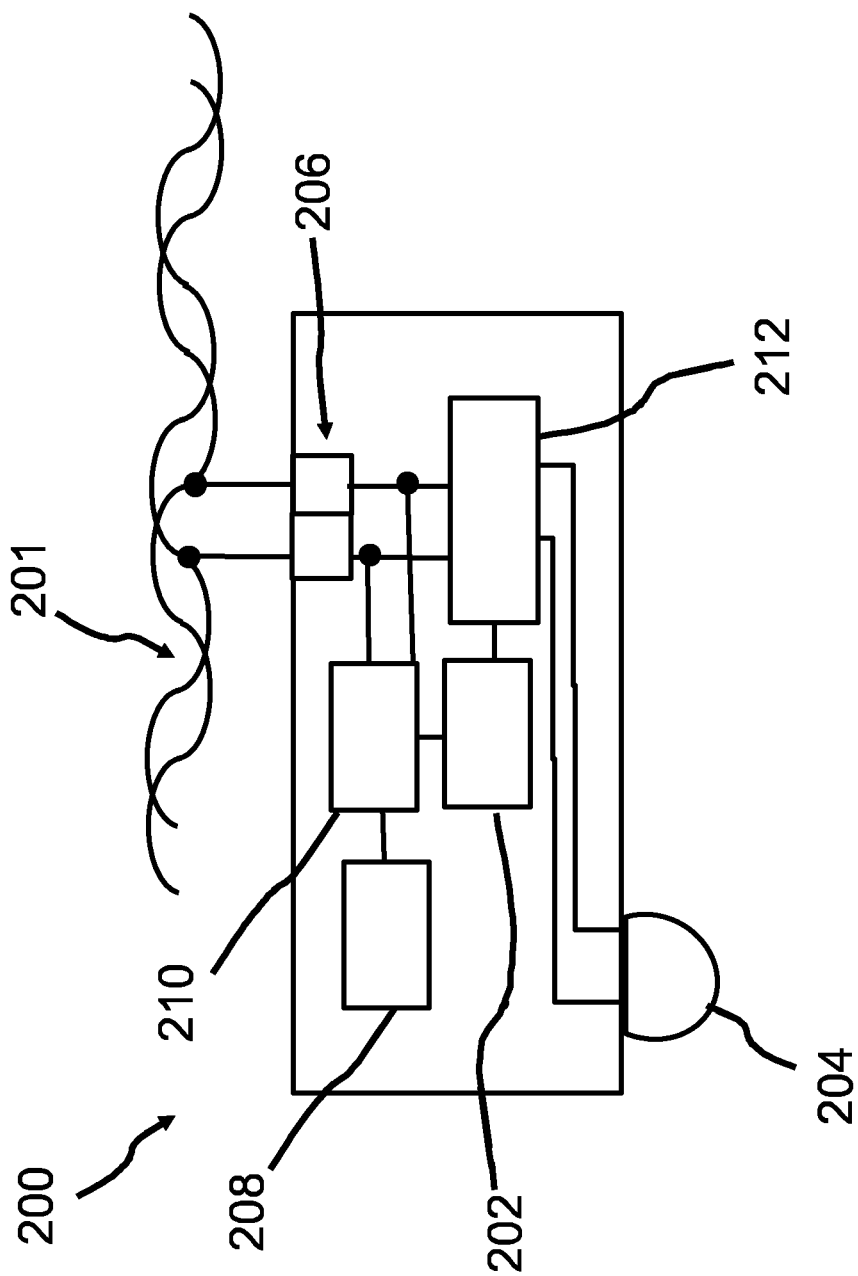
FIG. 2 shows a schematic block diagram of an embodiment of a DC-powered device.

FIG. 2 shows an embodiment of a DC-powered device 200 connected to a single twisted-pair wired bus 201. The DC-powered device 200 comprises a DC-powered device control unit 202 configured to control operation of the DC-powered device 200 in a regular operation mode of an electrical load device 204 and in an initialization mode, the initialization mode requiring a predetermined initialization DC input power amount lower than an operational DC-power amount required by the regular operation mode of the DC-powered device. It also comprises an input power interface 206 for receiving DC-power from a DC-power supply device (not shown) via the single twisted-pair wired bus 201. The DC-powered device comprises a storage unit 208 configured to store DC-power requirement information indicative of a DC-voltage requirement and a DC-current requirement for operation of the DC-powered device in the regular operation mode. The DC-powered device also comprises a DC-powered device communication unit 210 that is configured to provide, while the DC-powered device is operated in the initialization mode, the DC-power requirement information via the wired bus, and a power converting unit 212 comprising a down converter stage configured to receive DC-power with an input DC-voltage and to output, while the DC-powered device is operated in the regular operation mode, a converted DC power with a down converted DC-voltage equal to or lower than the input DC-voltage and in accordance with the DC voltage requirement.

The down converter stage is configured to allow operation over a full PoDL DC-voltage range, i.e. a range of DC-voltage levels of the DC-output power, which typically ranges between 3.3V-60V. 3.3V are commonly provided during the initialization supply mode. Nominal DC-voltages values of operational DC output power amounts during the operation supply mode range from 4.41V in Class 1 PSEs and 60V in Class 9 PSE, wherein the class classification of the PSE corresponds to the PoDL standard.

The following table, Table 1, shows a class power requirement matrix according to the PoDL standard.

|  | PSE 12 V unregulated | | PSE 12 V regulated | | PSE 24 V unregulated | | PSE 24 V regulated | | PSE 48 V regulated | |
|---|---|---|---|---|---|---|---|---|---|---|
| Class | 0 | 1 | 2 | 3 | 4 | 5 | 6 | 7 | 8 | 9 |
| $V_{PSE(max)}$ (V) | 18 | 18 | 18 | 18 | 36 | 36 | 36 | 36 | 60 | 60 |
| $V_{PSE\_OC(min)}$ (V) | 6 | 6 | 14.4 | 14.4 | 12 | 12 | 26 | 26 | 48 | 48 |
| $V_{PSE(min)}$ (V) | 5.6 | 5.77 | 14.4 | 14.4 | 11.7 | 11.7 | 26 | 26 | 48 | 48 |
| $I_{PI(max)}$ (mA) | 101 | 227 | 249 | 471 | 97 | 339 | 215 | 461 | 735 | 1360 |
| $P_{Class(min)}$ (W) | 0.566 | 1.31 | 3.59 | 6.79 | 1.14 | 3.97 | 5.59 | 12 | 35.5 | 65.3 |
| $V_{PD(min)}$ (V) | 4.94 | 4.41 | 12 | 10.6 | 10.3 | 8.86 | 23.3 | 21.7 | 40.8 | 36.7 |
| $P_{PD(max)}$ (W) | 0.5 | 1 | 3 | 5 | 1 | 3 | 5 | 10 | 30 | 30 |

Wherein $V_{PSE(max)}$ is the maximum allowed DC-voltage of the operational DC output power amount of the DC-power device supply, $V_{PSE\_OC(min)}$ is the minimum allowed open circuit voltage measured at the power interface of the DC-power supply device, $V_{PSE(min)}$ is the minimum allowed DC-voltage of the operational DC output power amount of the DC-power device supply, $I_{PI(max)}$ is the maximum DC-current flowing through the power interface in normal operation condition, i.e. excluding exceptional conditions such as inrush or overload. This value can be exceeded during inrush or overload conditions and users are cautioned to be aware of the limitations of the system as well as of local codes and regulations, $P_{Class(min)}$ is the minimum average operational DC output power amount at the power interface of the DC-power supply device, $V_{PD(min)}$ is the minimum required DC voltage for a DC-powered device to operate in the regular operation mode, and $P_{PD(max)}$ is the maximum average available operational DC power at the input power interface of a DC-powered device.

Figure 3:
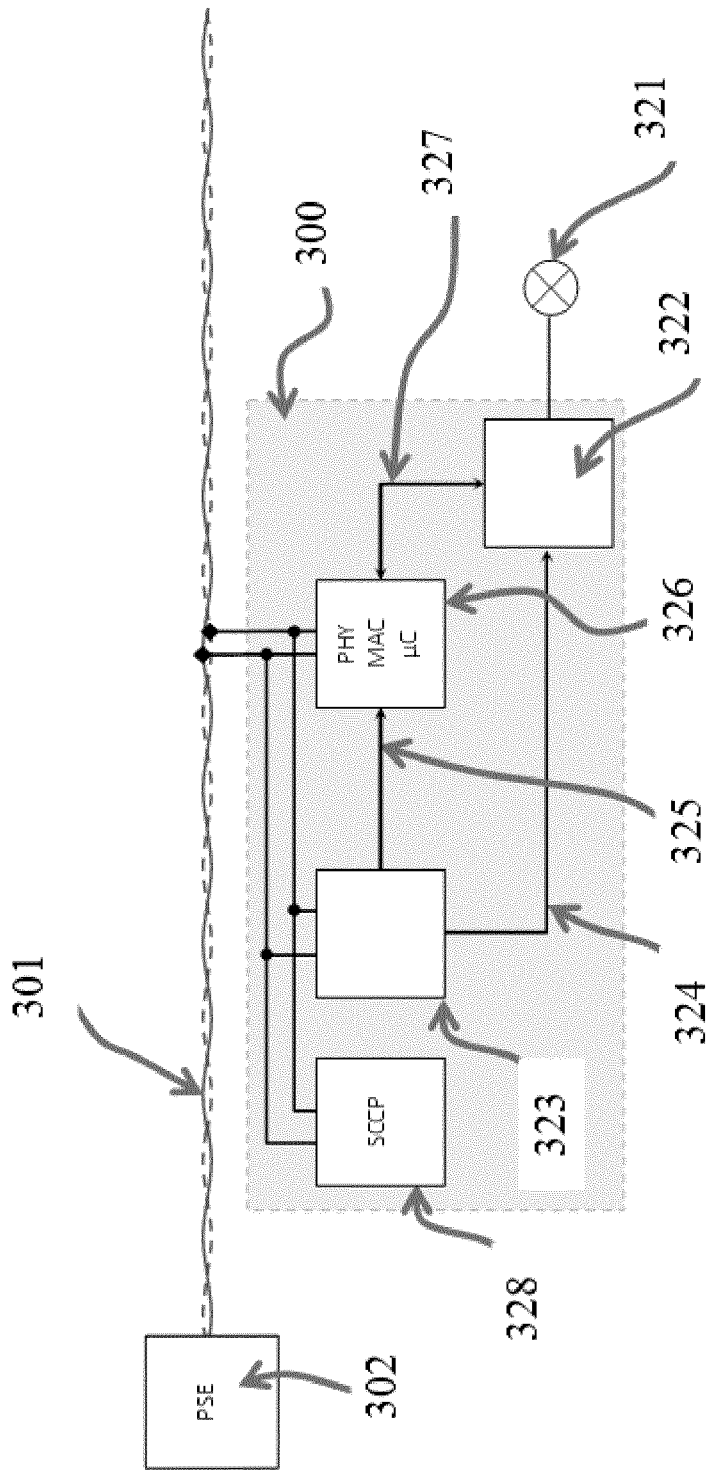
FIG. 3 shows a schematic block diagram of another embodiment of a DC-powered device connected to a DC-power supply device via a single twisted-pair wired bus.

FIG. 3 shows another exemplary DC-powered device 300 connected to a DC-power supply device 302, referred to as Power Sourcing Equipment (PSE) via a single twisted-pair wired bus 301. The PSE 302 is configured to supply DC-power via the wired bus and is operable in two different operation modes. In an initialization supply mode, the PSE 302 delivers a predetermined initialization DC output power amount to the wired bus, wherein the initialization DC output power amount is suitable for driving the connected DC-powered devices in their initialization mode that includes transmission of the respective power requirement information for their respective regular operation mode to the DC-power-supply device via the wired bus. It is further operable in an operation supply mode, wherein the DC-power supply device delivers a determined operational DC output power amount to the connected DC-powered devices via the power interface. In this example, the PSE 302 also performs as a wired-bus master for a serial communication classification protocol (SCCP). The DC-powered device 300 comprises an SCCP initialization negotiation circuit 328, a 10SPE client 326 and a power converting unit 3233. In this example the 10SPE client 326 comprises a microprocessor and the storage unit 322. The 10SPE client is thus configured to act as the DC-powered device communication unit and as the DC-powered device control unit. It advantageously includes 10SPE PHY and MAC functionality combined with a microcontroller functionality and interconnection 324, 325, 327, as well as an access 321.

An exemplary PSE 302 is configured to provide, in an initialization supply mode, sufficient DC-power to detect that minimally one compatible network node is installed. This identification can be done using the serial communication classification protocol (SCCP) of the PoDL standard, which also allows to collect information of multiple parallel connected nodes. When the PSE has not detected the presence of any single node in this step, no power is applied and SCCP is used to detect when a first node i.e., DC-powered device, is connected. If at least one node has been detected, a basic DC-voltage (start-up Voltage as selected in a respective power class through SCCP, see table 1) is applied at the wired bus. This functionality is part of the PoDL standard.

After the basic DC-voltage is applied at the wired bus, thus providing an initialization DC output power amount via the power interface of the PSE 302, all connected nodes, such as node 300, start up their respective DC-powered device control units and their respective DC-powered device communication units, or in the case of node 300, the 10SPE client 326, which comprises both the DC-powered device control unit and the DC-powered device communication unit. Each node then provides DC-power requirement information about the preferred voltage with resulting current requirements as well as all compatible voltages with the related maximum current values. This communication between the DC-powered devices and PSE 302 can optimally be done using Link Layer Discovery Protocol (LLDP) packets, preferably non-routed LLDP packets.

The PSE 302 collects all the DC-power requirement information of the connected DC-powered devices and determines an operational DC output power amount being suitable for powering operation of at least one of the connected DC-powered devices in its respective regular operation mode. This determination is based on a predetermined power determination rule. In a non-limiting example, one of the connected DC-powered devices needs a certain DC-voltage to function and all other connected DC-powered device are able to function with this DC-voltage.

Figure 4:
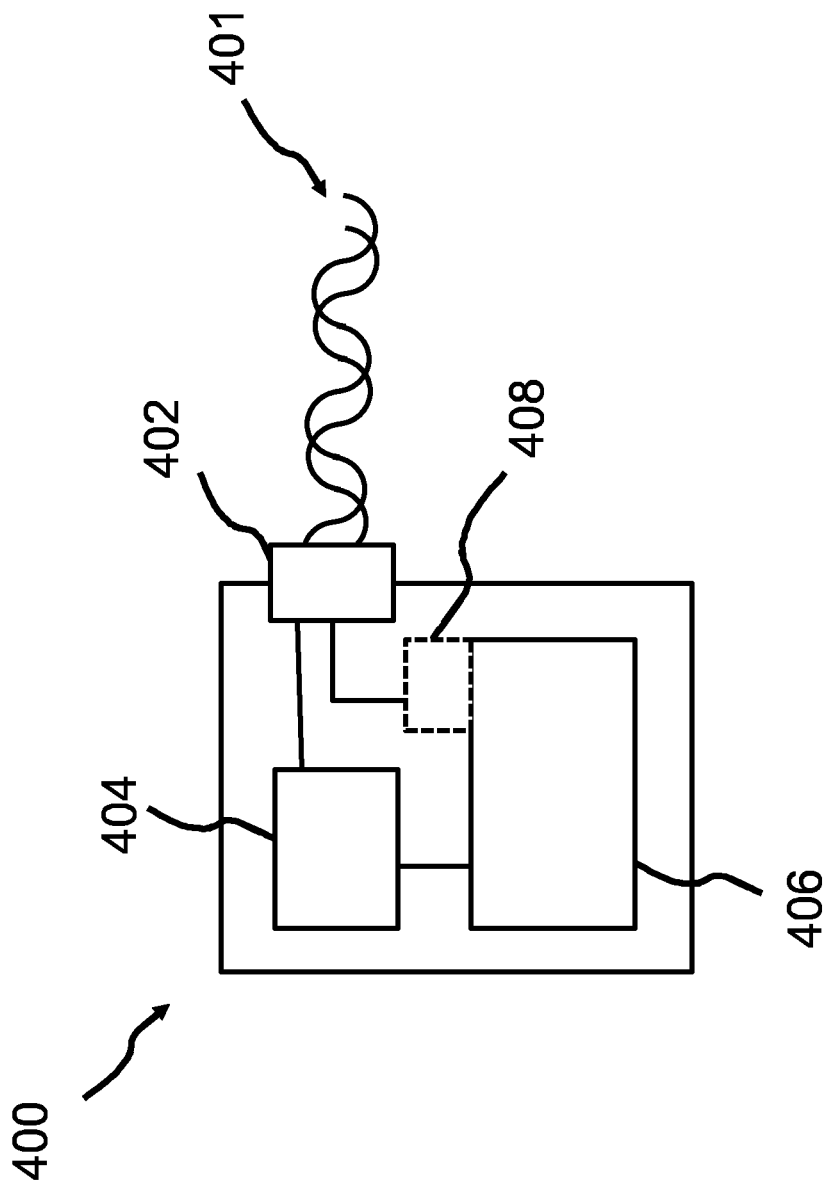
FIG. 4 shows a schematic block diagram of an embodiment of a DC-power supply device connected to a single twisted-pair wired bus.

FIG. 4 shows an exemplary DC-power supply device 400 connected to a single twisted-pair wired bus 401. The DC-power supply comprises a power interface 402 for providing, via a single twisted-pair wired bus, DC output power to a plurality of DC-powered devices that are connected in parallel via the wired bus. It also comprises a DC-power-supply network communication unit 404 configured to receive via the power interface, from the DC-powered devices connected via the wired bus 401, respective DC-power requirement information indicative of a DC-voltage requirement and a DC-current requirement for operation of the respective DC-powered devices in their respective regular operation mode. The DC-power supply device also comprises a DC-power-supply control unit 406, which is configured:

- to drive, operating the DC-power supply device 400 in an initialization supply mode, delivery of a predetermined initialization DC output power amount via the power interface, wherein the initialization DC output power amount is suitable for driving the connected DC-powered devices in their initialization mode that includes transmission of the respective power requirement information for their respective regular operation mode to the DC-power-supply device via the wired bus 401,
- to determine, using the DC-power requirement information received from the connected DC-powered devices and a predetermined power-determination rule, an operational DC output power amount to be output via the output power interface, the operational DC output power amount being suitable for powering operation of at least one of the connected DC-powered devices in its respective regular operation mode, and
- to subsequently drive, operating the DC-power supply device in an operation supply mode, delivery of the determined operational DC output power amount to the connected DC-powered devices via the power interface 402.

Optionally, DC-power supply device 400 may also comprise a DC-powered device detection unit 408, shown in dashed lines, and configured to detect, while the DC-power supply device is being operated in the initialization mode, a connection of at least one DC-powered device to the output power interface via the wired bus and to provide an initialization detection signal indicative thereof to the DC-power-supply control unit. In this DC-power supply device the DC-power-supply control unit is configured to drive, in the initialization mode, delivery of the predetermined initialization DC output power amount via the power interface upon receiving the detection signal.

Preferably, the DC-powered device detection unit 408 is further configured to detect, while the DC-power supply device is being operated in the operation supply mode, a new connection event involving connection of an additional DC-powered device to the wired bus, and a disconnection event involving disconnection of a previously connected DC-powered device from the wired bus 401, and to provide a respective event detection signal indicative of the new connection event or of the disconnection event. In this particular DC-power supply device the DC-power-supply control unit 406 is further configured, while operating the DC-power supply device in the operation supply mode:

- upon reception of the event detection signal indicative of a new connection event, to maintain, for providing the initialization DC-power amount to the additional DC-powered device, a currently provided operational DC-voltage amount; and
- upon reception of the event detection signal indicative of a new connection event or of a disconnection event, to re-determine, based on the predetermined power-determination rule and on the DC-voltage requirements and the DC-current requirements of the DC-powered devices that are currently connected to the wired bus, the operational DC output power amount to be output via the power interface.

Therefore, such a DC-power supply device is suitable for negotiating power delivery also while operating in the operation supply mode, particularly in the event of a new connection or a disconnection of a DC-powered device.

When a new DC-powered device gets connected it has to be able to power up from all possible voltage levels that can be provided by the DC-power supply device. It is assumed that the DC-power supply device, within its limitation regarding a maximum DC-current subject to be provided, keeps a headroom in available power for newly connected DC-powered devices in order to guarantee that no overcurrent situation gets detected which would lead to power removal for all DC-powered devices, which in turn would lead to a network restart.

When a new suitable DC-powered device or node is connected to the wired bus it is configured to operate in initialization mode and provide the DC-power requirement information, typically by means of LLDP communication. The DC-powers supply device receives the DC-power requirement information from the newly connected node and re-determines the operating DC output power amount.

An exemplary DC-power supply device is also configured to monitor a disconnection of a DC-powered device from the wired bus. For example, monitoring can be performed by detecting a change in DC power consumption of the set of DC-powered devices connected. Alternatively, or additionally, in suitable DC-power supply devices, the monitoring can be performed by detecting whether or not that a connected network device MAC is missing based on MAC-address related information. Otherwise there will not be any clear signaling of a DC-powered device disconnection as long as it does not announce an intention to get disconnection. In accordance with the PoDL standard, the DC-power supply device regularly checks the impedance at the power interface and can hence detect that no node is connected to the wired bus, in order to cease provision of operational DC output power via the power interface.

Preferably, any DC-powered device or node that is not able to operate continuously in the regular operation mode with the given operating DC output power amount should be shut down. This can e.g. happen be at a high wired-bus DC-voltage for low power nodes supplied not by a linear regulator. Such a voltage regulator may not be able to sustainably deliver DC power to the nodes with the related high linear losses.

In many applications, a high DC voltage applied to the wired bus implies low DC currents and hence low losses in cabling and filters. This is especially true for long wired-buses and/or high-power DC-powered devices connected. However, for super low power nodes like e.g. movement detectors based on PIR effect, low bus voltages may be optimal. This is because supplying these from high rail voltage implies high losses in any liner voltage regulator but using a SMPS for supply may often cause switching losses easily being higher than the sensor's DC power request.

So if many nodes are needing only low wattage, some power determination rules may result in a reduction of the DC-voltage of the operational DC output power amount as allowed in PoDL to the lowest level that still supplies sufficiently the power-hungry nodes (like cameras, IR or RF nodes). Tables may be used to evaluate and determine the optimal operational DC output power amount to be delivered and the corresponding optimal DC-voltage.

Also, preferably, some DC-powered devices may be requested by the DC-power supply device to cut their power usages to allow prioritized power usage by an added DC-powered device. For such an action, the added DC-powered device sends the DC-power requirement information requiring DC-power that is not currently available and signals a high priority via power priority level data. The DC-power supply device uses the power determination rule, that can for instance include budgeting tables, to find the connected DC-powered device with lowest priority level currently supplied with DC-power. If the priority level of this node is below the priority level of the newly connected DC-powered device, the former will be requested to shut down. If the available DC power amount is still not high enough, the DC-power supply device repeats the search again as described above.

Figure 5:
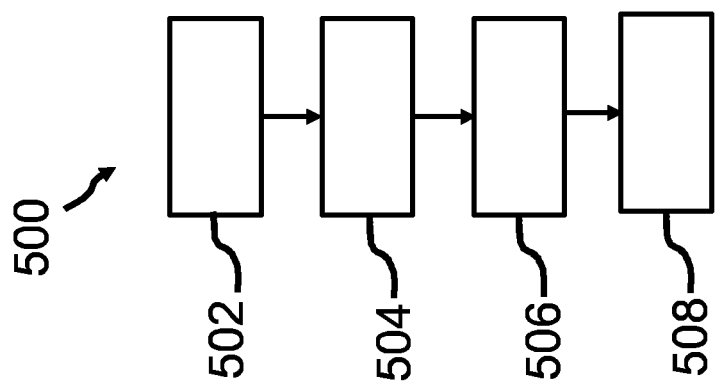
FIG. 5 shows a schematic flow diagram of a method for operating a DC-power supply device.

FIG. 5 shows a flow diagram of an embodiment of a method 500 for operating a DC-power supply for supplying operational DC power to one or more DC-powered devices, each DC-powered device operable in an initialization mode requiring a lower DC power amount than in a respective regular operation mode of the DC-powered device, the method includes, in a step 502, while operating the DC-power supply device in an initialization mode, driving delivery of a predetermined initialization DC output power amount via the power interface, wherein the initialization DC output power amount is suitable for driving the connected DC-powered devices in their initialization mode that includes transmission of the respective power requirement information for their respective regular operation mode to the DC-power-supply device via a single twisted-pair wired bus. The method comprises, in a step 504, receiving via the power interface, from the DC-powered devices connected via the single twisted-pair wired bus, respective DC-power requirement information indicative of a DC-voltage requirement and a DC-current requirement for operation of the respective DC-powered devices in their respective regular operation mode. The method comprises, in a step 506, determining, from among a plurality of available DC output power amounts that the DC-power supply device is configured to supply in an operation supply mode, using the DC-power requirement information received from the connected DC-powered devices and a predetermined power-determination rule, an operational DC output power amount to be output via the output power interface, the operational DC output power amount having an operational DC voltage amount being suitable for powering operation of the connected DC-powered devices in their respective regular operation modes and, in a step 508, subsequently driving, operating the DC-power supply device in an operation supply mode, distribution of the determined operational DC output power amount to the connected DC-powered devices via the power interface.

FIG. 6 shows a flow diagram of an embodiment of a method 600 for operating a DC-powered device that is operable in a regular operation mode and in an initialization mode, the initialization mode requiring a predetermined initialization DC input power amount lower than an operational DC-power amount required by the regular operation mode of the DC-powered device. The method comprises, in a step 602, storing, in a storage unit, DC-power requirement information indicative of a DC-voltage requirement and a DC-current requirement for operation of the DC-powered device in the regular operation mode. The method comprises, in a step 604, receiving DC-power from a DC-power supply device via a single twisted-pair wired bus. The method also comprises, in a step 606, and while the DC-powered device is operated in the initialization mode, providing the DC-power requirement information via the wired bus.—The method further comprises, in a step 608, and while the DC-powered device is operated in the regular operation mode, receiving DC-power with an input DC-voltage having an operational DC voltage amount from among a plurality of available DC output power amounts that the DC-power supply device is configured to supply and providing, in a step 610, converted DC power with a down converted DC-voltage equal to or lower than the input DC-voltage and in accordance with the DC voltage requirement. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A DC-power supply device for supplying operational DC power to a plurality of DC-powered devices via a single twisted-pair wired bus, each DC-powered device operable in an initialization mode requiring a lower DC power amount than in a respective regular operation mode of the DC-powered device, the DC-power supply device comprising:
   a power interface for providing, via the single twisted-pair wired bus, DC output power to the plurality of DC-powered devices that are connected in parallel via the single twisted-pair wired bus;
   a DC-power-supply network communication unit configured to receive via the power interface by means of link layer discovery protocol (LLDP) communication, from the DC-powered devices connected via the single twisted-pair wired bus, respective DC-power requirement information indicative of a DC-voltage requirement and a DC-current requirement for operation of the respective DC-powered devices in their respective regular operation mode, wherein the DC-power requirement information comprises preferred voltage with resulting current requirements as well as all compatible voltages with the related maximum current values; and
   a DC-power-supply control unit, which is configured:
      to drive, operating the DC-power supply device in an initialization supply mode, delivery of a predetermined initialization DC output power amount via the power interface, wherein the initialization DC output power amount is suitable for driving the connected DC-powered devices in their initialization mode that includes transmission of the respective power requirement information for their respective regular operation mode to the DC-power-supply device via the single twisted-pair wired bus;
      to determine from among a plurality of available DC output power amounts that the DC-power supply device is configured to supply in an operation supply mode, using the DC-power requirement information received from each of the plurality of DC-powered devices and a predetermined power-determination rule, an operational DC output power amount to be output via the output power interface, the operational DC output power amount having an operational DC voltage amount being suitable for powering operation of the plurality of DC-powered devices in their respective regular operation modes;

to subsequently drive, operating the DC-power supply device in the operation supply mode, distribution of the determined operational DC output power amount to the plurality of DC-powered devices via the power interface, such that the single twisted-pair wired bus is provided with a DC-voltage amount for powering each of the plurality of DC-powered devices; and a DC-powered device detection unit is configured to detect, while the DC-power supply device is being operated in the operation supply mode, a new-connection event involving connection of an additional DC-powered device to the single twisted-pair wired bus, and a disconnection event involving disconnection of a previously connected DC-powered device from the single twisted-pair wired bus, and to provide a respective event detection signal indicative of the new-connection event or of the disconnection event; and wherein the DC-power-supply control unit is further configured, while operating the DC-power supply device in the operation supply mode:

upon reception of the event detection signal indicative of the new-connection event, to maintain, for providing the initialization DC-power amount to the additional DC-powered device, a currently provided operational DC-voltage amount; and upon reception of the event detection signal indicative of the new-connection event or of the disconnection event, to re-determine, based on the predetermined power-determination rule and on the DC-voltage requirements and the DC-current requirements of the DC-powered devices that are currently connected to the single twisted-pair wired bus, the operational DC output power amount to be output via the power interface.

2. The DC-power supply device of claim 1, wherein the DC-powered device detection unit is further configured to detect, while the DC-power supply device is being operated in the initialization mode, a connection of at least one DC-powered device to the output power interface via the single twisted-pair wired bus and to provide an initialization detection signal indicative thereof to the DC-power-supply control unit; wherein the DC-power-supply control unit is configured to drive, in the initialization mode, delivery of the predetermined initialization DC output power amount via the power interface upon receiving the detection signal.

3. The DC-power supply device of claim 2, wherein the DC-powered device detection unit is configured to perform, while operating in the initialization supply mode, a detection routine using a serial communication classification protocol in accordance with the IEEE 802.3bu standard.

4. The DC-power supply device of claim 1, wherein:

the DC-powered device detection unit is configured to determine a number of DC-powered devices connected in parallel to the single twisted-pair wired bus, and, upon determining that no DC-powered devices are currently connected, to provide a no-connection signal indicative thereof; and wherein the DC-power-supply control unit is configured to receive the no-connection signal and, upon reception thereof, to cease provision of operational DC-power via the single twisted-pair wired bus.

5. The DC-power supply device of claim 1, wherein, in dependence on the respective DC-voltage requirements and DC-current requirements, the DC-power-supply control unit is further configured to drive operation of the DC-power supply network communication unit for providing a shut-down request to one or more of the DC-powered devices via the single twisted-pair wired bus.

6. The DC-power supply device of claim 1, wherein:

the DC-power requirement information additionally includes power priority level data indicative of a hierarchical priority level of the respective DC-powered device among the connected DC-powered devices; wherein the DC-power-supply control unit is configured to determine the amount of operational DC-power further using the received priority level data.

7. The DC-power supply device of claim 1, wherein:

the DC-power-supply network communication unit is configured to transmit and receive data according to a IEEE 802.3bu standard; and wherein the DC-power-supply control unit is configured to drive operation of the output power interface according to the IEEE 802.3bu standard.

8. An electrical arrangement comprising:

the DC-power supply device according to claim 1;

the plurality of parallel-connected DC-powered devices;

the single twisted-pair wired bus connecting the power interface of the DC-power supply device and the power input interfaces of the one or more DC-powered devices, the single twisted-pair wired bus configured:

to transport DC-power provided by the DC-power supply device; and to transport DC-power requirement information in accordance with a predetermined communication protocol, wherein each DC-powered device comprises:

the DC-powered device control unit configured to control operation of the DC-powered device in a regular operation mode and in an initialization mode, the initialization mode requiring a predetermined initialization DC input power amount lower than the operational DC-power amount required by the regular operation mode of the DC-powered device;

an input power interface for receiving DC-power from a DC-power supply device via the single twisted-pair wired bus;

a storage unit configured to store DC-power requirement information indicative of the DC-voltage requirement and the DC-current requirement for operation of the DC-powered device in the regular operation mode;

the DC-powered device communication unit configured to provide, while the DC-powered device is operated in the initialization mode by means of the LLDP communication, the DC-power requirement information via the single twisted-pair wired bus, wherein the DC-power requirement information comprises preferred voltage with resulting current requirements as well as all compatible voltages with the related maximum current values; and a power converting unit connected with the input power interface and comprising a down converter stage configured to receive DC-power with an input DC-voltage having an operational DC voltage amount from among a plurality of available DC output power amounts that the DC-power supply device is configured to supply and to provide, for operation of the DC-powered device in its regular operation mode, a converted DC power with a down converted DC voltage amount that is equal to or lower than that of the input DC-voltage and in accordance with the DC voltage requirement.

9. The electrical arrangement of claim 8, wherein the DC-powered device control unit, during a power-up process of the DC-powered device, is configured to operate the DC-powered device in the initialization mode even upon detecting a connection of the DC-powered device to the single twisted-pair wired bus currently providing a DC-power-amount equal to or larger than the required predetermined initialization DC input power amount.

10. The electrical arrangement of claim 9, wherein the DC-power requirement information is indicative of a minimum required DC-voltage amount and a respective DC-current amount required for operating in different regular operation modes, and of other acceptable DC-voltage amounts and acceptable DC-current amounts compatible with operation of the DC-powered device in the different acceptable regular operation modes.

11. A method for operating a DC-power supply for supplying operational DC power to a plurality of DC-powered devices via a single twisted-pair wired bus, each DC-powered device operable in an initialization mode requiring a lower DC power amount than in a respective regular operation mode of the DC-powered device, the method comprising:

while operating the DC-power supply device in an initialization supply mode, driving delivery of a predetermined initialization DC output power amount via a power interface and the single twisted-pair wired bus, wherein the initialization DC output power amount is suitable for driving the plurality of DC-powered devices in their initialization mode that includes transmission of the respective power requirement information for their respective regular operation mode to the DC-power-supply device via the single twisted-pair wired bus;

receiving via the power interface by means of link layer discovery protocol (LLDP) communication, from each of the plurality of DC-powered devices connected via the single twisted-pair wired bus, respective DC-power requirement information indicative of a DC-voltage requirement and a DC-current requirement for operation of the respective DC-powered devices in their respective regular operation mode, wherein the DC-power requirement information comprises preferred voltage with resulting current requirements as well as all compatible voltages with the related maximum current values;

determining, from among a plurality of available DC output power amounts that the DC-power supply device is configured to supply in an operation supply mode, using the DC-power requirement information received from the plurality of DC-powered devices and a predetermined power-determination rule, an operational DC output power amount to be output via the output power interface, the operational DC output power amount having an operational DC voltage amount being suitable for powering operation of the plurality of DC-powered devices in their respective regular operation modes;

subsequently driving, operating the DC-power supply device in the operation supply mode, distribution of the determined operational DC output power amount to the plurality DC-powered devices via the power interface, such that the single twisted-pair wired bus is provided with a DC-voltage amount for powering each of the plurality of DC-powered devices; and detecting, while the DC-power supply device is being operated in the operation supply mode, a new-connection event involving connection of an additional DC-powered device to the single twisted-pair wired bus, and a disconnection event involving disconnection of a previously connected DC-powered device from the single twisted-pair wired bus, and to provide a respective event detection signal indicative of the new-connection event or of the disconnection event;

and upon reception of the event detection signal indicative of the new-connection event, to maintain, for providing the initialization DC-power amount to the additional DC-powered device, a currently provided operational DC-voltage amount; and upon reception of the event detection signal indicative of the new-connection event or of the disconnection event, to re-determine, based on the predetermined power-determination rule and on the DC-voltage requirements and the DC-current requirements of the DC-powered devices that are currently connected to the single twisted-pair wired bus, the operational DC output power amount to be output via the power interface.

12. A computer program comprising instructions which, when the program is executed by a computer, cause the computer to carry out the method of claim 11.

* * * * *